C. B. STILWELL.
METHOD OF MAKING RECEPTACLES.
APPLICATION FILED MAY 4, 1910.
997,717.
Patented July 11, 1911.
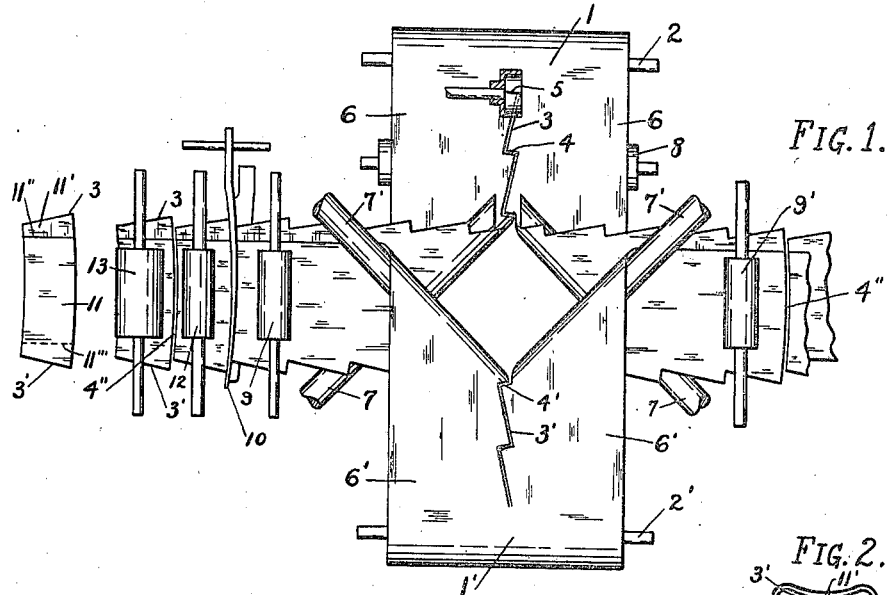
FIG. 1.
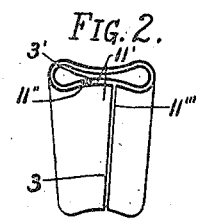
FIG. 2.
FIG. 5.
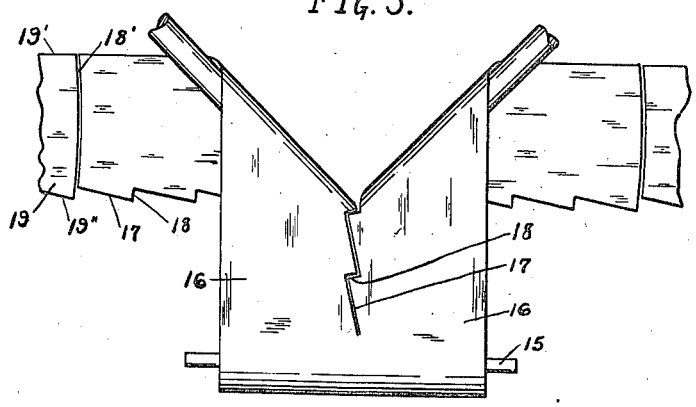
FIG. 3.
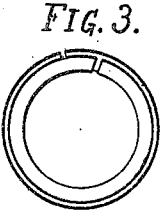
FIG. 4.
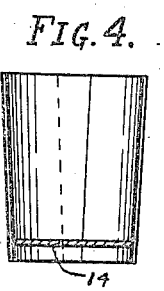
FIG. 6.
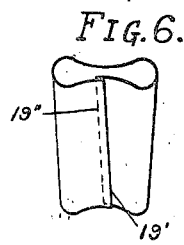
Witnesses:
Inventor:
Charles B. Stilwell

UNITED STATES PATENT OFFICE.

CHARLES B. STILWELL, OF WAYNE, PENNSYLVANIA.

METHOD OF MAKING RECEPTACLES.

997,717.     Specification of Letters Patent.     Patented July 11, 1911.

Application filed May 4, 1910. Serial No. 559,336.

*To all whom it may concern:*

Be it known that I, CHARLES B. STILWELL, a citizen of the United States, residing at Wayne, in the county of Delaware and State of Pennsylvania, have invented an Improved Method of Making Receptacles, of which the following is a specification.

My method of making receptacles comprises the production of blanks for making tapered tubes without waste of material, the objects being to produce a tapered tube containing the least practicable amount of material consistent with serviceability and to utilize the entire sheet from which the blanks are formed.

In the preferred practice of my method sheets of material are split along zig-zag lines or lines having angularly disposed elements corresponding to lines desired in the tubes to be formed, two of the half sheets thus formed are secured together with the production of a double sheet having single ply edges limited by the zig-zag lines symmetrically arranged with reference to a center line, the compound sheets thus formed are divided on parallel curved lines corresponding to the top and bottom edges of the tapered tubes which the blanks thus produced are adapted for forming, and the single ply edges of these blanks are connected in the form of a lap joint resulting in the production of a tube of uniform thickness.

The characteristic operations involved in my invention are illustrated in the accompanying drawings.

In the drawings, Figure 1 represents the operations of splitting the sheets, forming the two ply strips and dividing the latter into tube blanks; Fig. 2 is a perspective view of a folded blank having its edges joined; Fig. 3 is a top view of an expanded tube; Fig. 4 is a vertical sectional view of a receptacle formed from the expanded tube with a disk forced therein to form a bottom; Fig. 5 represents the operation of forming blanks from which tubes having a single thickness of material may be made; and Fig. 6 is a perspective view of a tube body formed by joining the edges of a single blank.

As shown in Fig. 1, two sheets of paper 1 and 1', with parallel edges, are drawn from the respective rollers 2 and 2' and split on the respective lines 3—4, 3'—4', as by a knife 5, whereby the sheets are divided into the respective strips 6 and 6', each of which has a serrated edge formed by the angularly disposed lines. The strips thus formed pass from the parallel rollers 2 and 2' over the angularly disposed bars 7 and 7', the strips 6' being drawn parallel to and upon the strips 6 so that the serrated edge of each shall project beyond the lap of the strips. A paste roller 8 is placed beneath the strips 6, between the rollers 2 and bars 7, and applies an adhesive thereto, so that the surfaces of the strips 6 which engage the strips 6' will adhere, the adhesion being perfected by passing the combined strips between pairs of rollers 9 and 9'. The combined strips are passed from the rollers 9 and 9' to curved shearing blades 10, which sever the strips on the lines 4'' concentric with and having the curvature of the lines 4 and 4', with which they coincide. Trapezoidal blanks 11 are thus formed which are discharged by rollers 12 and 13 from the shears 10. These blanks have the single ply ends 11' which are brought together by folding the blank and secured by an adhesive, forming a body having a lap joint, as shown in Fig. 2. The edges 3 and 3' are made to converge toward the lines 11'' and 11''' at the edges of the two ply portion of the blank so that when folded the juxtaposed lines will be parallel and the corresponding edges abut to provide a tapered tubular body of uniform thickness, as shown in Fig. 3. These bodies are adapted for receiving disks 14 which are wedged therein to form closures, as shown in Fig. 4.

Fig. 5 represents the method of forming blanks for a single ply tube. Here the sheet is drawn from a roll 15, split into strips 16 on lines 17 and 18 forming serrated edges, and the strips are divided on the curved lines 18' coincident with the lines 18. Blanks 19 are thus formed and are folded as shown in Fig. 6, the edges 19' and 19'' being lapped and glued to form the single ply tube.

Having described my invention, I claim:

1. The method of forming conical tubes which consists in splitting a sheet of material on angularly disposed lines forming serrated edges corresponding to lines desired in the blank, splitting the strips thus formed on lines substantially coincident with one of said angular lines, said angularly disposed lines being inclined to the outer edges of said sheet, and bringing together edges of the blanks thus produced to form said conical tubes.

2. The method of forming tube blanks which consists in dividing a sheet on angular lines forming strips having serrated edges, connecting strips thus formed to produce a strip having a two ply central section and single ply edge sections, and dividing said strip transversely on lines coincident with a set of said angular lines.

3. The method of forming tubes which consists in splitting sheets having parallel edges into strips along lines angularly disposed to each other and to said edges, fastening together strips so formed to provide a strip having edges limited by said angularly disposed lines, dividing said strip transversely on lines coincident with certain lines of said edges, and securing in overlapping relation edge sections of the blanks formed by severing said strip.

4. The method of forming tubes which consists in dividing sheets having parallel edges into strips having serrated edges formed by angularly disposed lines extending transverse to said parallel edges, superposing and pasting together strips thus formed to provide a composite strip, dividing said composite strip on lines coincident with certain lines of said serrated edges whereby to produce trapezoidal blanks, and joining the ends of said blanks.

5. The method of making tapered tubular receptacles which consists in splitting sheets of paper having parallel edges on lines angular to said edges, pasting together sheets thus formed with the production of composite strips having respectively an intermediate several ply section limited by parallel lines and edge sections of less ply limited by said angular lines, severing said composite strips transversely whereby to produce trapezoidal blanks, pasting together the lesser ply ends of said blanks so as to form a lap joint, and wedging a disk in the tapered tubular body thus formed.

In witness whereof I have hereunto set my name this 30th day of April, 1910, in the presence of the subscribing witnesses.

CHARLES B. STILWELL.

Witnesses:
ROBERT JAMES EARLEY,
JOS. G. DENNY, Jr.